United States Patent
Myoren et al.

(10) Patent No.: US 11,746,694 B2
(45) Date of Patent: Sep. 5, 2023

(54) COMPRESSOR AND GAS TURBINE

(71) Applicant: Mitsubishi Power, Ltd., Kanagawa (JP)

(72) Inventors: Chihiro Myoren, Tokyo (JP); Ryosuke Mito, Tokyo (JP); Daisuke Morita, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/624,976

(22) PCT Filed: Aug. 19, 2020

(86) PCT No.: PCT/JP2020/031259
§ 371 (c)(1),
(2) Date: Jan. 5, 2022

(87) PCT Pub. No.: WO2021/039531
PCT Pub. Date: Mar. 4, 2021

(65) Prior Publication Data
US 2022/0282666 A1  Sep. 8, 2022

(30) Foreign Application Priority Data
Aug. 29, 2019 (JP) .................................. 2019-156981

(51) Int. Cl.
*F02C 3/04* (2006.01)
*F04D 29/08* (2006.01)
*F04D 29/54* (2006.01)

(52) U.S. Cl.
CPC ................ *F02C 3/04* (2013.01); *F04D 29/08* (2013.01); *F04D 29/542* (2013.01); *F05D 2220/32* (2013.01); *F05D 2240/35* (2013.01)

(58) Field of Classification Search
CPC .... F02C 3/00; F02C 3/04; F04D 29/08; F04D 29/10; F04D 29/102; F04D 29/542;
(Continued)

(56) References Cited

U.S. PATENT DOCUMENTS

2003/0223855 A1   12/2003   Yuri et al.
2011/0033303 A1   2/2011    Pegouet
(Continued)

FOREIGN PATENT DOCUMENTS

JP   2004-3493     1/2004
JP   2011-518983   6/2011
(Continued)

OTHER PUBLICATIONS

International Search Report dated Oct. 13, 2020 in International Application No. PCT/JP2020/031259, with English-language translation.
(Continued)

*Primary Examiner* — Loren C Edwards
(74) *Attorney, Agent, or Firm* — Wenderoth, Lind & Ponack, L.L.P.

(57) ABSTRACT

A compressor includes a rotor including a plurality of disks, a shaft portion connected on a downstream side of the disks; and rotor blade rows fixed to the plurality of disks; a stator including a compressor casing; and a plurality of stator vane rows each provided between corresponding adjacent ones of the rotor blade rows; an outlet guide vane including blade main bodies disposed at an interval in a circumferential direction on the downstream side of the disk located most downstream, and inner shrouds connecting the blade main bodies in the circumferential direction, on an inner side in a radial direction; and an inner casing disposed on the downstream side of the disk located most downstream with a gap between the disk and the inner casing. The inner casing includes an outer peripheral wall surface having recesses accommodating the inner shrouds and forming, together with an inside surface of the compressor casing, a diffuser on the downstream side of the recesses, and an inner peripheral wall surface forming an air extraction cavity. An air extrac- (Continued)

tion hole is formed in a portion, in the recesses, on the downstream side.

6 Claims, 5 Drawing Sheets

(58) Field of Classification Search
CPC .. F04D 19/02; F05D 2220/32; F05D 2240/35; F05D 2250/52; F01D 25/12; F01D 5/08; F01D 5/081; F01D 11/001; F01D 11/02; F01D 11/08
See application file for complete search history.

(56) References Cited

U.S. PATENT DOCUMENTS

| | | |
|---|---|---|
| 2012/0060509 A1 | 3/2012 | Myoren et al. |
| 2012/0114459 A1* | 5/2012 | Benkler ................. F01D 5/088 415/115 |
| 2017/0023023 A1* | 1/2017 | Hiernaux .............. F04D 29/682 |
| 2017/0030375 A1 | 2/2017 | Shibata et al. |
| 2018/0266277 A1 | 9/2018 | Aschenbruck et al. |

FOREIGN PATENT DOCUMENTS

| | | |
|---|---|---|
| JP | 2011-163184 | 8/2011 |
| JP | 2012-62767 | 3/2012 |
| JP | 2012-97748 | 5/2012 |
| JP | 2017-31847 | 2/2017 |
| JP | 2017-172374 | 9/2017 |
| JP | 2018-155246 | 10/2018 |

OTHER PUBLICATIONS

Written Opinion of the International Searching Authority dated Oct. 13, 2020 in International Application No. PCT/JP2020/031259, with English-language translation.

* cited by examiner

COMPRESSOR AND GAS TURBINE

TECHNICAL FIELD

The present disclosure relates to a compressor and a gas turbine.

This application claims priority based on Japanese Patent Application No. 2019-156981 filed in Japan on Aug. 29, 2019, the contents of which are incorporated herein.

BACKGROUND ART

A compressor of a gas turbine includes a rotor having a plurality of disks stacked in an axial direction and rotor blade rows provided on outside surfaces of the disks, a casing covering the rotor from the outer peripheral side and having an inside surface provided with stator vane rows, and a cylindrical diffuser provided on the downstream side of the casing (see Patent Document 1 below). The diffuser is defined by the inside surface of the casing and a cylindrical inner casing disposed at an interval on the inside surface of the casing. The diffuser is configured to expand a flow path cross-sectional area toward the downstream side. As a result, the flow velocity of a high-pressure fluid flowing into the diffuser is reduced, and the static pressure is recovered.

Here, an outlet guide vane (OGV) is generally provided in the flow path of the diffuser described above. The outlet guide vane is provided by adopting a configuration in which a blade main body extending in the radial direction of the axis is cantilevered on the inside surface of the casing, or a configuration in which shrouds are respectively provided on the inner peripheral side of a plurality of blade main bodies. In the latter case, recesses for accommodating the shrouds are formed on the outside surface of the inner casing.

CITATION LIST

Patent Literature

Patent Document 1: JP 2012-62767 A

SUMMARY OF INVENTION

Technical Problem

However, as described above, static pressure recovery of the fluid occurs in the diffuser, whereby the pressure of the fluid increases toward the downstream side. Thus, a leak flow from the downstream side toward the upstream side may occur through the recesses described above. Such leak flow merges into the primary flow, which leads to a loss.

The present disclosure has been made in order to solve the problems described above, and an object of the present disclosure is to provide a compressor and a gas turbine in which a loss is further reduced by suppressing a leak flow.

Solution to Problem

In order to solve the above-described problems, a compressor according to the present disclosure includes a rotor including a plurality of disks stacked in an axial direction, a shaft portion connected on a downstream side in the axial direction of the disks, and a plurality of rotor blade rows fixed to the plurality of disks; a stator including a compressor casing surrounding the rotor from an outer peripheral side, and a plurality of stator vane rows fixed to the compressor casing and each provided between corresponding adjacent ones of the rotor blade rows; an outlet guide vane including blade main bodies disposed at an interval in a circumferential direction to protrude from the compressor casing on the downstream side in the axial direction of one of the disks located most downstream in the axial direction, and inner shrouds connecting the blade main bodies in the circumferential direction, on an inner side in a radial direction; and an inner casing disposed on the downstream side in the axial direction of the disk located most downstream in the axial direction with a gap between the disk and the inner casing, the inner casing extending in the axial direction in a cylindrical shape. The inner casing includes an outer peripheral wall surface having recesses accommodating the inner shrouds of the outlet guide vane, and forming, together with an inside surface of the compressor casing, a diffuser on the downstream side in the axial direction of the recesses, and an inner peripheral wall surface forming an air extraction cavity into which a fluid is introduced through the gap, the air extraction cavity being formed between the inner peripheral wall surface and an outside surface of the shaft portion. An air extraction hole is formed through the inner casing in the radial direction, in a portion, in the recesses, on the downstream side in the axial direction.

A compressor according to the present disclosure includes a rotor including a plurality of disks stacked in an axial direction, a shaft portion connected on a downstream side in the axial direction of the disks, and a plurality of rotor blade rows fixed to the plurality of disks; a stator including a compressor casing surrounding the rotor from an outer peripheral side, and a plurality of stator vane rows fixed to the compressor casing and each provided between corresponding adjacent ones of the rotor blade rows; an outlet guide vane including blade main bodies disposed at an interval in a circumferential direction to protrude from the compressor casing on the downstream side in the axial direction of one of the disks located most downstream in the axial direction, and inner shrouds connecting the blade main bodies in the circumferential direction, on an inner side in a radial direction; a rotor extension portion provided on the downstream side in the axial direction of the disk located most downstream in the axial direction, the rotor extension portion including recesses accommodating the inner shrouds of the outlet guide vane; and an inner casing disposed on the downstream side in the axial direction of the rotor extension portion with a gap between the rotor extension portion and the inner casing, the inner casing extending in the axial direction in a cylindrical shape. The inner casing includes an outer peripheral wall surface forming, together with an inside surface of the compressor casing, a diffuser on the downstream side in the axial direction of the recesses, and an inner peripheral wall surface forming an air extraction cavity between the inner peripheral wall surface and an outside surface of the shaft portion. A communication portion opening toward the downstream side in the axial direction and being in communication with the air extraction cavity between the recesses and the inner casing is formed in a portion, in the recesses, on the downstream side in the axial direction.

Advantageous Effects of Invention

According to the present disclosure, it is possible to provide a compressor and a gas turbine in which a loss is further reduced by suppressing a leak flow.

DESCRIPTION OF EMBODIMENTS

First Embodiment

Configuration of Gas Turbine

Figure 1:
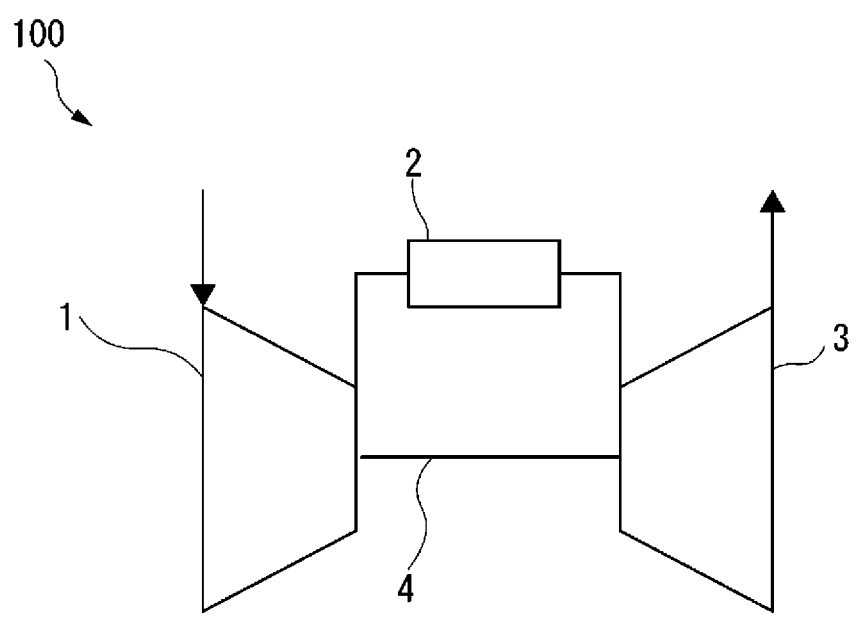
FIG. 1 is a schematic view illustrating a configuration of a gas turbine according to a first embodiment of the present disclosure.

Hereinafter, a gas turbine 100 and a compressor 1 according to a first embodiment of the present disclosure will be described with reference to FIGS. 1 to 3. Note that in the following description, the term "identical" means that the dimensions and shapes are substantially the same, and design tolerances and manufacturing errors are acceptable. As illustrated in FIG. 1, the gas turbine 100 includes a compressor 1, a combustor 2, a turbine 3, and a rotor 4. The compressor 1 compresses air taken in from the outside to generate high-pressure air. The combustor 2 generates high-temperature and high-pressure combustion gas by burning an air-fuel mixture of the high-pressure air and a fuel. The turbine 3 is driven by the combustion gas. The compressor 1 and the turbine 3 are coaxially connected by the rotor 4. Accordingly, the rotational driving force of the turbine 3 is transmitted to the compressor 1 via the rotor 4. As a result, the compressor 1 is driven.

Configuration of Compressor

Next, the configuration of the compressor 1 will be described with reference to FIGS. 2 and 3. The compressor 1 includes the rotor 4 described above, as well as a stator 7, outlet guide vanes 8, and an inner casing 9. The rotor 4 has a cylindrical shape extending in a direction of an axis Ax. The rotor 4 includes a plurality of disks 4D stacked in the direction of the axis Ax, a shaft portion 4S, and an inducer 42.

Figure 2:
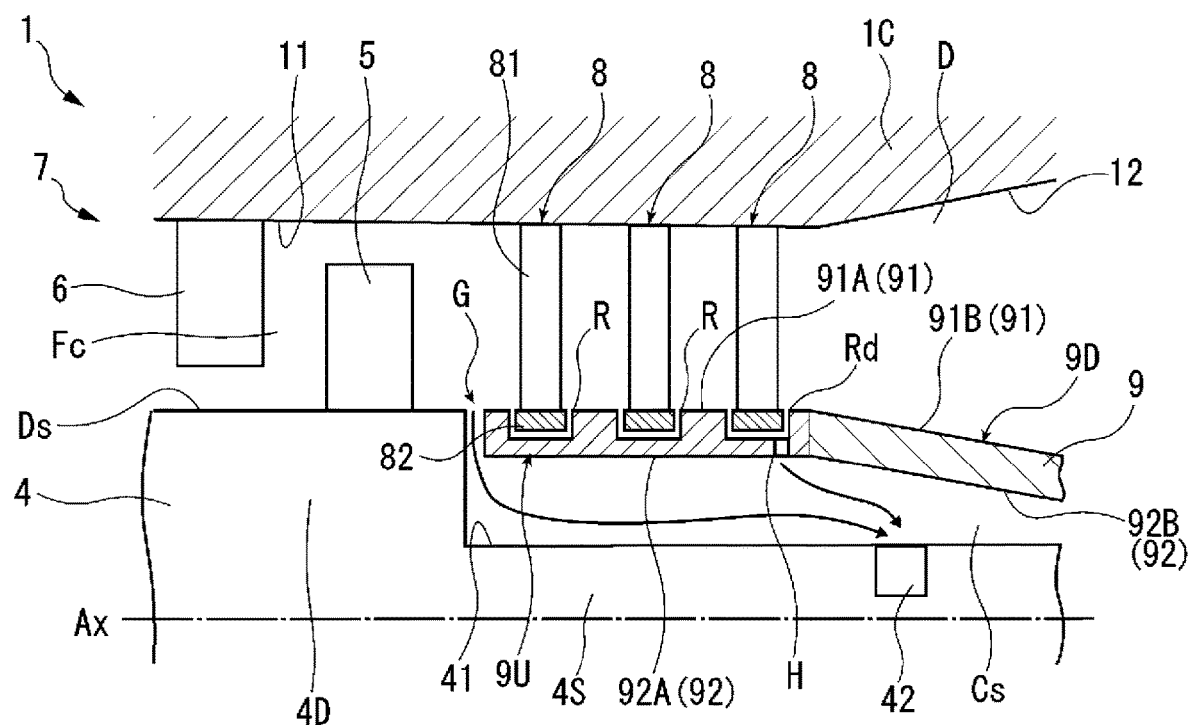
FIG. 2 is a cross-sectional view illustrating a configuration of a compressor according to the first embodiment of the present disclosure.
Figure 3:
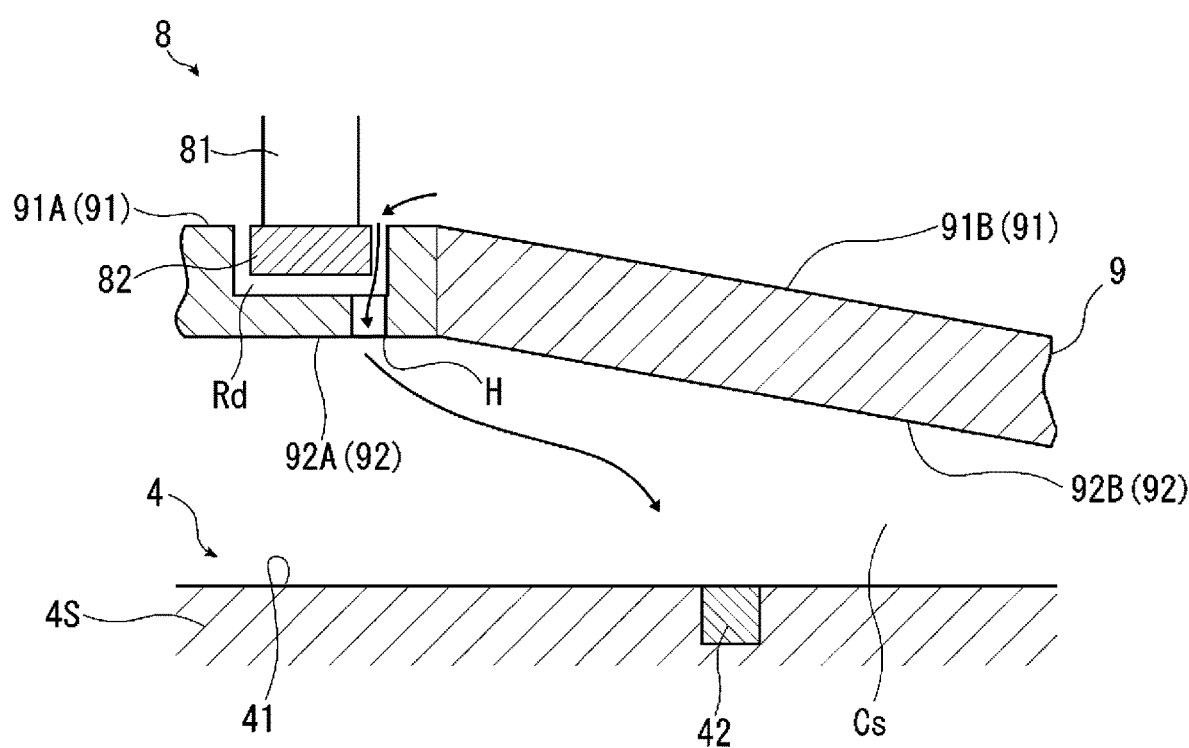
FIG. 3 is an enlarged cross-sectional view of a main part in FIG. 2.

Note that FIG. 2 illustrates only the disk 4D located most downstream in the direction of the axis Ax (air flow direction) (hereinafter referred to as the downstream side in the axial direction) among the plurality of disks 4D stacked in the direction of the axis Ax.

The disks 4D are disk-shaped about the axis Ax. Each of the disks 4D is provided with a rotor blade row 5. The rotor blade row 5 includes a plurality of rotor blades extending outward in the radial direction from the outside surface (disk outside surface Ds) of the disk 4D. The plurality of rotor blades are arranged in the circumferential direction with respect to the axis Ax.

The shaft portion 4S protrudes further downstream in the axial direction from an end surface on the downstream side in the axial direction of the disk 4D located most downstream in the axial direction in the direction of the axis Ax (the air flow direction) among the plurality of disks 4D. The diameter dimension of the shaft portion 4S is smaller than the diameter dimension of the disk 4D.

The inducer 42 is an intake mechanism provided on the outside surface of the shaft portion 4S (shaft portion outside surface 41). Although not illustrated in detail, the inducer 42 sucks air near the shaft portion outside surface 41 as the shaft portion 4S (rotor 4) rotates. The sucked air is used, for example, for cooling high-temperature members of the turbine 3 or the like.

The stator 7 includes a compressor casing 1C and stator vane rows 6. The compressor casing 1C has a cylindrical shape centered on the axis Ax. The compressor casing 1C covers the rotor 4 from the outer peripheral side. A plurality of stator vane rows 6 are provided on a portion (casing inside surface 11) of the inside surface of the compressor casing 1C facing the disks 4D. Note that the example in FIG. 2 illustrates only one stator vane row 6. The stator vane row 6 includes a plurality of stator vanes extending inward in the radial direction from the casing inside surface 11. The plurality of stator vanes are arranged in the circumferential direction with respect to the axis Ax. Additionally, the stator vane rows 6 are arranged alternately with the rotor blade rows 5 described above along the axis Ax. The space between the casing inside surface 11 and the disk outside surface Ds (i.e., the space provided with the rotor blade rows 5 and the stator vane rows 6) is a compression flow path Fc through which high-pressure air flows.

A portion of the inside surface of the compressor casing 1C that is more downstream in the axial direction than the casing inside surface 11 described above is an enlarged-diameter surface 12. The enlarged-diameter surface 12 extends outward in the radial direction toward the downstream side in the axial direction.

The plurality of outlet guide vanes 8 are provided on the downstream side in the axial direction of the rotor blade row 5 most downstream in the axial direction on the casing inside surface 11. The outlet guide vanes 8 are provided for regulating the flow of the high-pressure air that has flowed downstream in the axial direction through the rotor blade row 5 most downstream in the axial direction (reducing a swirling component). The plurality of outlet guide vanes 8 are arranged in the direction of the axis Ax on the downstream side in the axial direction of the disk 4D most downstream in the axial direction. In the present embodiment, three rows of outlet guide vanes 8 are provided as an example. The outlet guide vanes 8 include a plurality of blade main bodies 81 projecting inward in the radial direction from the casing inside surface 11 and disposed at an interval in the circumferential direction, and inner shrouds 82 connecting the blade main bodies 81 in the circumferential direction. Radially inner end portions of the blade main bodies 81 are at the same position in the radial direction as the disk outside surface Ds described above. The inner shrouds 82 are provided at the radially inner end portions of the blade main bodies 81. Each of the inner shrouds 82 has an annular shape centered on the axis Ax. The dimension of the inner shrouds 82 in the direction of the axis Ax is larger than the dimension of the blade main bodies 81 in the direction of the axis Ax.

An inner casing 9 is provided on the downstream side in the axial direction of the disk 4D most downstream in the axial direction through a gap G extending in the direction of the axis Ax. The inner casing 9 has a cylindrical shape extending in the direction of the axis Ax. The inner casing 9 includes an inner casing upstream portion 9U located on the upstream side in the direction of the axis Ax (hereinafter referred to as the upstream side in the axial direction) and an inner casing downstream portion 9D located on the downstream side in the axial direction.

The inner casing upstream portion 9U is a portion of the inner casing 9, corresponding to the outlet guide vanes 8 described above in the direction of the axis Ax. The outer diameter dimension of the outside surface of the inner casing upstream portion 9U (first outside surface 91A) is the same as the outer diameter dimension of the disk 4D. The first outside surface 91A has a constant outer diameter dimension across the entire area in the direction of the axis Ax. Similarly, the inside surface of the inner casing upstream portion 9U (first inside surface 92A) also has a constant inner diameter dimension across the entire area in the direction of the axis Ax.

The first outside surface 91A has a plurality of recesses R formed thereon for accommodating the inner shrouds 82 described above. Each of the recesses R is recessed inward in the radial direction from the first outside surface 91A. Each recess R has an annular shape centered on the axis Ax and has a rectangular shape in a cross-sectional view including the axis Ax. A small gap is formed between the recess R and the inner shroud 82. That is, the volume of the recess R is slightly larger than the volume of the inner shroud 82. The outside surface of the inner shroud 82 is at the same position as the first outside surface 91A in the radial direction.

The inner casing downstream portion 9D is integrally provided on the downstream side in the axial direction of the inner casing upstream portion 9U. The outside surface of the inner casing downstream portion 9D (second outside surface 91B) extends inward in the radial direction toward the downstream side in the axial direction. The second outside surface 91B faces the enlarged-diameter surface 12 of the compressor casing 1C described above. The inside surface of the inner casing downstream portion 9D (second inside surface 92B) also extends inward in the radial direction toward the downstream side in the axial direction.

The first outside surface 91A and the second outside surface 91B described above form an outer peripheral wall surface 91 of the inner casing 9. This outer peripheral wall surface 91 and the inside surface of the compressor casing 1C form a diffuser space D (diffuser). The diffuser space D is provided for recovering static pressure by reducing the flow velocity of the high-pressure air that has flowed downstream in the axial direction through the compression flow path Fc described above.

Additionally, a first inside surface 92A and a second inside surface 92B form an inner peripheral wall surface 92 of the inner casing 9. A space serving as an air extraction cavity Cs is formed between this inner peripheral wall surface 92 and the outside surface (shaft portion outside surface 41) of the shaft portion 4S. The air extraction cavity Cs is in communication with the diffuser space D through the gap G formed between the inner casing 9 and the disk 4D most downstream in the axial direction. Air within the air extraction cavity Cs is extracted by the inducer 42 described above. Specifically, in the air extraction cavity Cs, a flow of air from the gap G toward the inducer 42 is formed.

Furthermore, an air extraction hole H is formed in a recess Rd located most downstream in the axial direction, among the plurality of recesses R described above. This air extraction hole H extends inward in the radial direction from the bottom surface (the surface on the inner peripheral side) of the recess Rd, to be formed through the inner casing 9 in the radial direction. Thus, the diffuser space D and the air extraction cavity Cs are in communication with each other through this air extraction hole H. With this configuration, in the air extraction cavity Cs, in addition to the air flow from the gap G toward the inducer 42 described above, another air flow from the air extraction hole H toward the inducer 42 is formed. Note that, as illustrated in an enlarged view in FIG. 3, the air extraction hole H is formed in a portion of the recess Rd that is more downstream in the axial direction. In other words, the air extraction hole H has an end surface, on the downstream side in the axial direction, in contact with an end surface of the recess Rd on the downstream side in the axial direction.

Operational Effects

Next, the operation of the gas turbine 100 and the compressor 1 according to the present embodiment is explained. To drive the gas turbine 100, first, the rotor 4 is rotated by an external driving source (such as an electric motor). As the rotor 4 rotates, the compressor 1 takes in air from the outside and compresses it to generate high-pressure air. The combustor 2 mixes fuel with this high-pressure air to generate an air-fuel mixture, and burns the air-fuel mixture to generate high-temperature and high-pressure combustion gas. The combustion gas is supplied to the turbine 3 and drives the turbine 3 (applies rotational force to the rotor 4). The rotational force of the rotor 4 is transmitted to the compressor 1. The gas turbine 100 is driven through continuous occurrence of such a cycle.

In the compressor 1, high-pressure air is supplied to the diffuser space D through the compression flow path Fc. Here, static pressure recovery of the flow of air occurs in the diffuser space D, whereby the pressure increases toward the downstream side in the axial direction. Thus, when the air extraction hole H described above is not formed, for example, a leak flow from the downstream side in the axial direction toward the upstream side in the axial direction may occur through the gap between the recesses R and the inner shrouds 82. Such leak flow merges into the primary flow, which leads to a loss. In view of this, in the compressor 1 according to the present embodiment, the air extraction hole H through which the air extraction cavity Cs and the diffuser space D are in communication with each other is formed in the recess Rd most downstream in the axial direction. With this configuration, a leak flow that flows into the recess Rd most downstream in the axial direction can be guided to the air extraction cavity Cs through the air extraction hole H. As a result, a leak flow toward the upstream side in the axial direction beyond the recess Rd can be reduced. Thus, a loss occurring in the compressor 1 can be suppressed.

Furthermore, with the configuration described above, the plurality of outlet guide vanes 8 are provided, so that a swirling component (a flow component swirling in the rotational direction of the rotor 4) included in the flow of a fluid flowing into the diffuser space D can be suppressed to be much smaller. As a result, the flow component in the direction of the axis Ax increases, whereby the performance of the compressor 1 can be further improved.

Furthermore, with the configuration described above, the air extraction hole H is formed, so that reduction of a leak flow and suppression of development of a boundary layer in the diffuser space D can both be achieved. Accordingly, as described above, the diameter of the second outside surface 91B, which is a portion of the inner casing 9 that is more downstream in the axial direction than the outlet guide vanes 8 can be reduced toward the downstream side in the axial direction. Thus, the cross-sectional area of the flow path of the diffuser space D can be further increased. As a result, static pressure recovery of the fluid by the diffuser space D can be further facilitated.

Second Embodiment

Figure 4:
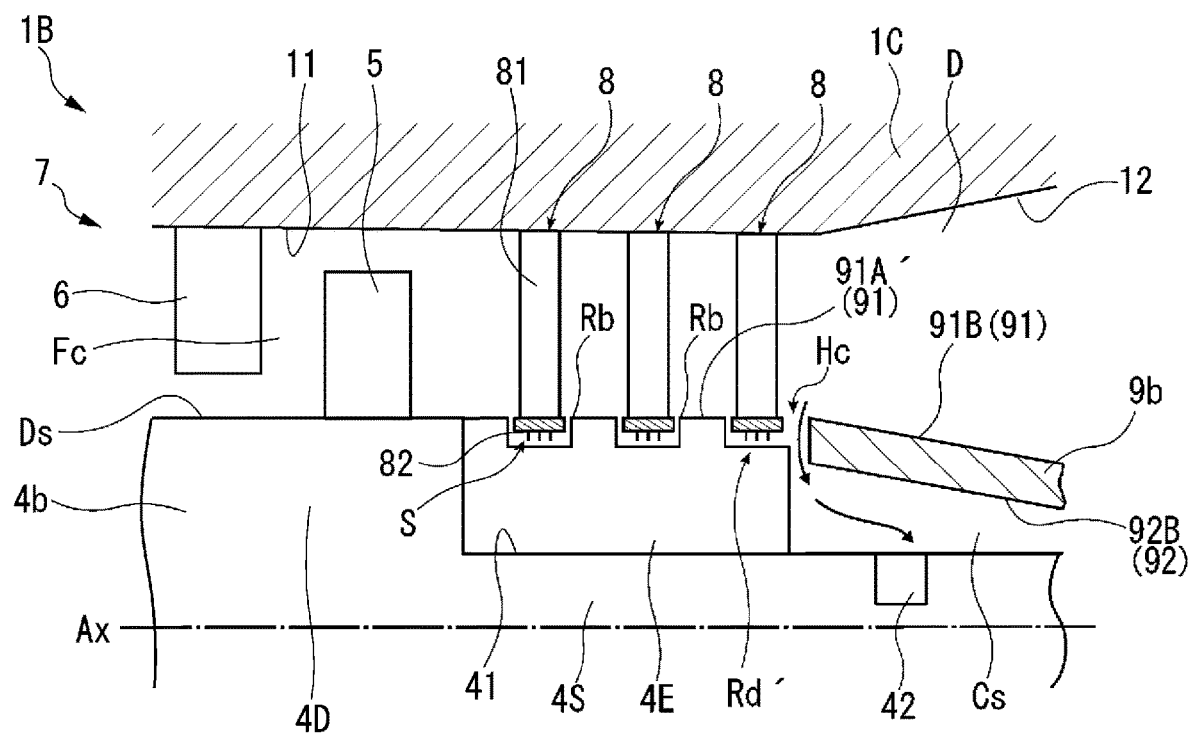
FIG. 4 is a cross-sectional view illustrating a configuration of a compressor according to a second embodiment of the present disclosure.
Figure 5:
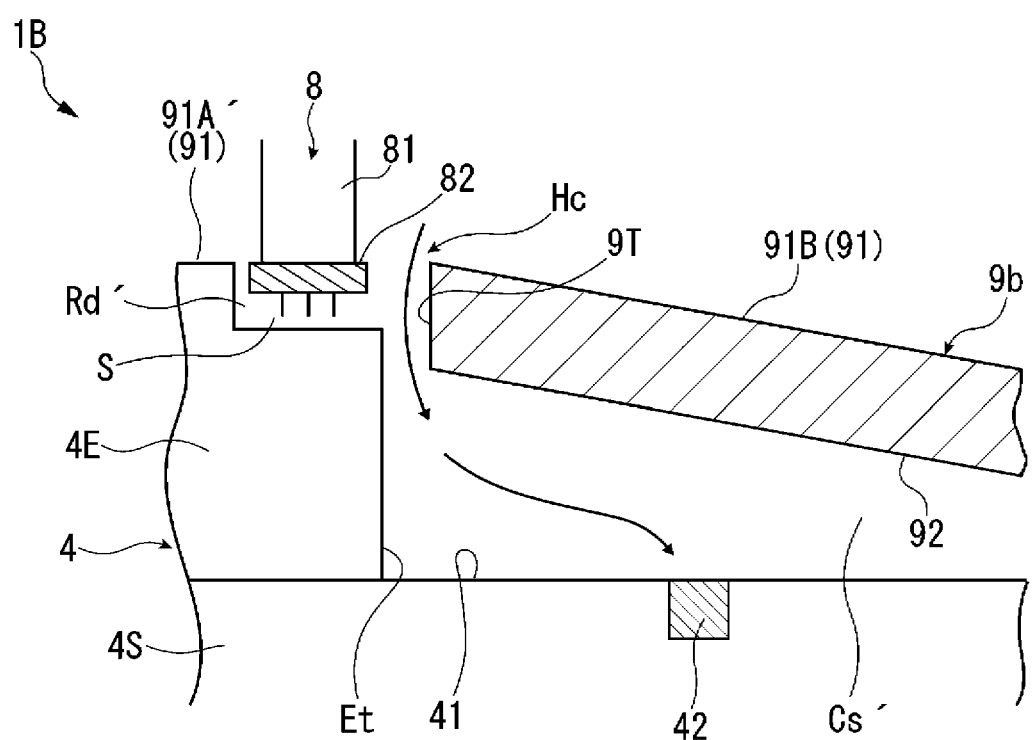
FIG. 5 is an enlarged cross-sectional view of a main part in FIG. 4.

Next, a second embodiment of the present disclosure will be described with reference to FIGS. 4 and 5. Note that the same components as those of the first embodiment will be denoted by the same reference signs, and a detailed description thereof will be omitted. A compressor 1B according to the present embodiment is different from the first embodiment mainly in terms of the configurations of a rotor 4b and an inner casing 9b.

The rotor 4b further includes a rotor extension portion 4E integrally formed more downstream in the axial direction than the disk 4D most downstream in the axial direction. The rotor extension portion 4E is formed in a tubular shape with the axis Ax being at the center, to cover the above described shaft portion 4S from the outer peripheral side without a gap. The outside surface of the rotor extension portion 4E is a first outside surface 91A' having a diameter dimension that is the same as the outer diameter dimension of the disk outside surface Ds. A plurality of recesses Rb that accommodate the inner shrouds 82 of the outlet guide vanes 8 are formed in the first outside surface 91A'. In addition, in the present embodiment, the inside surface of the inner shrouds 82 is provided with a seal portion S for sealing the flow of fluid between the recesses Rb and the inner shrouds 82. Specifically, the seal portion S is a plurality of seal fins protruding inward in the radial direction from the inside surface of the inner shrouds 82. Note that other configurations such as a labyrinth seal can also be used as the seal portion S instead of the sealing fins.

A recess Rd' located most downstream in the axial direction among the plurality of recesses Rb, has a shape that is different from those of the other recesses Rb located on the upstream side in the axial direction. Specifically, the recess Rd' has a portion on the downstream side in the axial direction open toward the downstream side in the axial direction. In other words, the recess Rd' is defined only by the end surface on the upstream side in the axial direction and the bottom surface.

The inner casing 9b is provided on the downstream side in the axial direction of the recess Rd' with a gap (a communication portion Hc) provided in the direction of the axis Ax. The inner casing 9b has a cylindrical shape extending inward in the radial direction with respect to the axis Ax, toward the downstream side in the axial direction. The outside surface (second outside surface 91B) of the inner casing 9b and the first outside surface 91A' together form the outer peripheral wall surface 91. The outer peripheral wall surface 91 and the inside surface of the compressor casing 1C together define the diffuser space D, as in the first embodiment described above.

The inside surface of the inner casing 9b serves as the inner peripheral wall surface 92. An air extraction cavity Cs' is formed between the inner peripheral wall surface 92 and the shaft portion outside surface 41. An end surface (upstream side end surface 9T) of the inner casing 9b on the upstream side in the axial direction faces an end surface (extension portion end surface Et) of the recess Rd' and the rotor extension portion 4E on the downstream side in the axial direction with the communication portion Hc described above provided therebetween.

Here, static pressure recovery of the fluid occurs in the diffuser space D, whereby the pressure of the fluid increases toward the downstream side in the axial direction. Thus, a leak flow from the downstream side in the axial direction toward the upstream side in the axial direction may occur through the recesses Rb described above. Such leak flow merges into the primary flow, which leads to a loss. Still, in the configuration described above, the recess Rd' has a portion on the downstream side in the axial direction open toward the downstream side in the axial direction. Furthermore, a gap serving as the communication portion He is formed between the recess Rd' and the inner casing 9b. With this configuration, a leak flow that flows into the recess Rd' can be guided to the air extraction cavity Cs' through the communication portion Hc. As a result, a leak flow toward the upstream side in the axial direction beyond the recess Rd' can be reduced. As a result, the performance of the compressor 1B can be further improved.

Furthermore, with the configuration described above, a plurality of outlet guide vanes 8 are provided, so that a swirling component (a flow component swirling in the rotational direction of the rotor 4) included in the flow of air flowing into the diffuser space D on the downstream side in the axial direction thereof can be suppressed to be much smaller. As a result, the flow component toward the direction of the axis Ax increases, whereby the performance of the compressor 1B can be further improved.

Furthermore, with the configuration described above, the communication portion He is formed, so that reduction of a leak flow and suppression of development of a boundary layer in the diffuser space D can both be achieved. Thus, with the diameter of the inner casing 9b decreasing toward the downstream side in the axial direction as described above, the flow path cross-sectional area of the diffuser can be increased. As a result, static pressure recovery of the fluid by the diffuser space D can be further facilitated.

Furthermore, with the configuration described above, a leak flow toward the upstream side in the axial direction through the recess Rd' can be further reduced by the seal portion S.

Other Embodiments

Embodiments of the present disclosure have been described above in detail with reference to the drawings, but the specific configurations are not limited to these embodiments, and design changes and the like that do not depart from the scope of the present disclosure are also included.

Note that the seal portion S described in the second embodiment can be also applied to the first embodiment. In addition, the number of the outlet guide vanes 8 and the number of recesses R corresponding to the same is not limited to the above-described embodiments and drawings, and can be changed as appropriate in accordance with the design and specifications.

Notes

The compressor 1 and the gas turbine 100 described in the embodiments are understood as follows, for example.

(1) A compressor 1 according to a first aspect includes a rotor 4 including a plurality of disks 4D stacked in a direction of an axis Ax, a shaft portion 4S connected on a downstream side in the axial direction of the disks 4D, and a plurality of rotor blade rows 5 fixed to the plurality of disks 4D; a stator 7 including a compressor casing 1C surrounding the rotor 4 from an outer peripheral side, and a plurality of stator vane rows 6 fixed to the compressor casing 1C and each provided between corresponding adjacent ones of the rotor blade rows 5; an outlet guide vane 8 including blade main bodies 81 disposed at an interval in a circumferential direction to protrude from the compressor casing 1C on the downstream side in the axial direction of one of the disks 4D located most downstream in the axial direction, and inner shrouds 82 connecting the blade main bodies 81 in the circumferential direction, on an inner side in a radial direction; and an inner casing 9 disposed on the downstream side in the axial direction of the disk 4D located most downstream in the axial direction with a gap G between the disk 4D and the inner casing 9, the inner casing 9 extending in the direction of the axis Ax in a cylindrical shape. The inner casing 9 includes an outer peripheral wall surface 91 having recesses R accommodating the inner shrouds 82 of the outlet guide vane 8, and forming, together with an inside surface of the compressor casing 1C, a diffuser D on the downstream side in the axial direction of the recesses R, and an inner peripheral wall surface 92 forming an air extraction cavity Cs into which a fluid is introduced through the gap G, the air extraction cavity Cs being formed between the inner peripheral wall surface 92 and an outside surface of the shaft portion 4S. An air extraction hole H is formed through the inner casing 9 in the radial direction, in a portion, in the recesses R, on the downstream side in the axial direction.

Here, static pressure recovery of the fluid occurs in the diffuser D, whereby the pressure of the fluid increases toward the downstream side in the axial direction. Thus, a leak flow from the downstream side in the axial direction toward the upstream side in the axial direction may occur through the recesses R described above. Such leak flow merges into the primary flow, which leads to a loss. However, in the configuration described above, the air extraction hole H is formed in the portion, in the recesses D, on the downstream side in the axial direction. With this configuration, a leak flow that flows into the recesses R can be guided to the air extraction cavity Cs through the air extraction hole H. As a result, a leak flow toward the upstream side in the axial direction beyond the recesses R can be reduced.

(2) In the compressor 1 according to a second aspect, a plurality of the outlet guide vanes 8 are arranged at an interval in the direction of the axis Ax, and the recess R is provided for each of the outlet guide vanes 8.

With the configuration described above, a plurality of outlet guide vanes 8 are provided, so that a swirling component (a flow component swirling in the rotational direction of the rotor) included in the flow of the fluid flowing into the diffuser D on the downstream side in the axial direction can be suppressed to be much smaller. As a result, the flow component toward the direction of the axis Ax increases, whereby the performance of the compressor 1 can be further improved.

(3) In the compressor 1 according to a third aspect, the air extraction hole H is formed in one recess Rd of the plurality of recesses R located most downstream in the axial direction.

With the above-described configuration, since the air extraction hole H is formed in the recess Rd most downstream in the axial direction, it is possible to reduce the likelihood of a leak flow reaching the upstream side in the axial direction of the recess Rd on the downstream side in the axial direction.

(4) In the compressor 1 according to a fourth aspect, a portion of the inner casing 9 that is more on the downstream side in the axial direction than the outlet guide vane 8 extends inward in the radial direction toward the downstream side in the axial direction.

With the configuration described above, the air extraction hole H is formed, so that reduction of a leak flow and suppression of development of a boundary layer in the diffuser D can both be achieved. Accordingly, as described above, the diameter of a portion more downstream in the axial direction than the outlet guide vanes 8 in the inner casing 9 can be reduced toward the downstream side in the axial direction. Thus, the cross-sectional area of the flow path of the diffuser D can be increased. As a result, static pressure recovery of the fluid by the diffuser D can be further facilitated.

(5) A compressor 1B according to a fifth aspect includes: a rotor 4 including a plurality of disks 4D stacked in a direction of an axis Ax, a shaft portion 4S connected on a downstream side in the axial direction of the disks 4D, and a plurality of rotor blade rows 5 fixed to the plurality of disks 4D; a stator 7 including: a compressor casing 1C surrounding the rotor 4 from an outer peripheral side, and a plurality of stator vane rows 6 fixed to the compressor casing 1C and each provided between corresponding adjacent ones of the rotor blade rows 5; an outlet guide vane 8 including blade main bodies 81 disposed at an interval in a circumferential direction to protrude from the compressor casing 1C on the downstream side in the axial direction of one of the disks 4D located on a most downstream side in the axial direction, and inner shrouds 82 connecting the blade main bodies 81 in the circumferential direction, on an inner side in a radial direction; a rotor extension portion 4E provided on the downstream side in the axial direction of the disk 4D located most downstream in the axial direction, the rotor extension portion 4E including recesses Rb accommodating the inner shrouds 82 of the outlet guide vane 8; and an inner casing 9b disposed on the downstream side in the axial direction of the rotor extension portion 4E with a gap between the rotor extension portion 4E and the inner casing 9b, the inner casing 9b extending in the direction of the axis Ax in a cylindrical shape. The inner casing 9b includes an outer peripheral wall surface 91 forming, together with an inside surface of the compressor casing 1C, a diffuser D on the downstream side in the axial direction of the recesses Rb, and an inner peripheral wall surface 92 forming an air extraction cavity Cs' between the inner peripheral wall surface 92 and an outside surface of the shaft portion 4S. A communication portion Hc opening toward the downstream side in the axial direction and being in communication with the air extraction cavity Cs' between the recesses Rb and the inner casing 9b is formed in a portion, the recesses Rb, on the downstream side in the axial direction.

Here, static pressure recovery of the fluid occurs in the diffuser D, whereby the pressure of the fluid increases toward the downstream side in the axial direction. Thus, a leak flow from the downstream side in the axial direction toward the upstream side in the axial direction may occur through the recesses Rb described above. Such a leak flow merges into the primary flow, which leads to a loss. Still, in the configuration described above, the recesses Rb have a portion on the downstream side in the axial direction open toward the downstream side in the axial direction. Furthermore, a gap serving as the communication portion Hc is formed between the recesses Rb and the inner casing 9b. With this configuration, a leak flow that flows into the recesses Rb can be guided to the air extraction cavity Cs' through the communication portion Hc. As a result, a leak flow toward the upstream side in the axial direction of the recesses Rb can be reduced.

(6) In the compressor 1B according to a sixth aspect, a plurality of the outlet guide vanes 8 are arranged at an interval in the direction of the axis Ax, and the recesses Rb are provided for each of the outlet guide vanes 8.

With the configuration described above, the plurality of outlet guide vanes 8 are provided, so that a swirling component (a flow component swirling in the rotational direction of the rotor) included in the flow of the fluid flowing into the diffuser D on the downstream side in the axial direction can be suppressed to be much smaller. As a result, the flow component toward the direction of the axis Ax increases, whereby the performance of the compressor 1B can be further improved.

(7) In the compressor 1B according to a seventh aspect, one recess Rd' of the plurality of recesses Rb located most downstream in the axial direction is in communication with the communication portion Hc.

With the above-described configuration, since the recess Rd' most downstream in the axial direction is in communication with the communication portion Hc, it is possible to reduce the likelihood of a leak flow reaching the upstream side in the axial direction of the recess Rd' on the downstream side in the axial direction.

(8) In the compressor 1B according to an eighth aspect, the inner casing 9b extends inward in the radial direction toward the downstream side in the axial direction.

With the configuration described above, the communication portion He is formed, so that reduction of a leak flow and suppression of development of a boundary layer in the diffuser D can both be achieved. Accordingly, as described above, the diameter of the inner casing 9b can be reduced toward the downstream side in the axial direction. Thus, the cross-sectional area of the flow path of the diffuser D can be increased. As a result, static pressure recovery of the fluid by the diffuser D can be further facilitated.

(9) A compressor 1B according to a ninth aspect further includes a seal portion S that is provided in the inside surface of each of the inner shrouds 82 and seals a flow of a fluid between the inside surface and a corresponding one the recesses Rb.

With the configuration described above, a leak flow toward the upstream side in the axial direction through the recesses Rb can be further reduced by the seal portion S.

(10) A gas turbine 100 according to a tenth aspect includes: the compressor 1, 1B according to any one of the above aspects; a combustor 2 that generates combustion gas by burning an air-fuel mixture of a fuel and a high-pressure fluid generated by the compressor 1, 1B; and a turbine 3 that is driven by the combustion gas.

With the configuration described above, a leak flow of the compressors 1, 1B is reduced, whereby the loss of the compressors 1, 1B is reduced. As a result, the efficiency of the gas turbine 100 can be further improved.

INDUSTRIAL APPLICABILITY

According to the present disclosure, it is possible to provide a compressor and a gas turbine in which a loss is further reduced by suppressing a leak flow.

REFERENCE SIGNS LIST

100 Gas turbine
1, 1B Compressor
1C Compressor casing
11 Casing inside surface
12 Enlarged-diameter surface
2 Combustor
3 Turbine
4, 4b Rotor
41 Shaft portion outside surface
42 Inducer
4D Disk
4E Rotor extension portion
4S Shaft portion
5 Rotor blade row
6 Stator vane row
7 Stator
8 Outlet guide vane
81 Blade main body
82 Inner shroud
9, 9b Inner casing
9D Inner casing downstream portion
9U Inner casing upstream portion
9T Upstream side end surface
91 Outer peripheral wall surface
92 Inner peripheral wall surface
91A, 91A' First outside surface
91B Second outside surface
92A First inside surface
92B Second inside surface
Ax Axis
Cs, Cs' Air extraction cavity
D Diffuser space
Ds Disk outside surface
Et Extension portion end surface
Fc Compression flow path
H Air extraction hole
Hc Communication portion
R, Rb, Rd, Rd' Recess

The invention claimed is:

1. A compressor comprising:
a rotor including a plurality of disks stacked in an axial direction, a shaft portion connected on a downstream side in the axial direction of the disks, and a plurality of rotor blade rows fixed to the plurality of disks;
a stator including a compressor casing surrounding the rotor from an outer peripheral side, and a plurality of stator vane rows fixed to the compressor casing and each of the plurality of stator vane rows provided between corresponding adjacent ones of the plurality of rotor blade rows;
a plurality of outlet guide vane rows, each of the plurality of outlet guide vane rows including a plurality of blade main bodies disposed at an interval in a circumferential direction to protrude from the compressor casing on a downstream side in the axial direction of one of the disks located on a most downstream side in the axial direction, and a plurality of inner shrouds connecting the blade main bodies in the circumferential direction, on an inner side in a radial direction, wherein each row of the plurality of outlet guide vane rows is arranged at an interval in the axial direction, and the plurality of rotor blade rows is located upstream relative to the plurality of outlet guide vane rows; and
an inner casing disposed on the downstream side in the axial direction of the disk located on the most downstream side in the axial direction with a gap between the disk located on the most downstream side and the inner casing, the inner casing extending in the axial direction in a cylindrical shape,
wherein the inner casing includes:
an outer peripheral wall surface having a plurality of annular recesses, a recess of the plurality of annular recesses is provided for each row of the plurality of outlet guide vane rows to accommodate the respective inner shroud of each row of the plurality of outlet guide vane rows, and forming, together with an inside surface of the compressor casing, a diffuser on a downstream side of the plurality of annular recesses in the axial direction;
and an inner peripheral wall surface forming an air extraction cavity into which a fluid is introduced through the gap, the air extraction cavity being formed between the inner peripheral wall surface and an outside surface of the shaft portion; and an air extraction hole is formed through the inner casing in the radial direction, wherein the air extraction hole is formed in a most downstream recess of the plurality of annular recesses in the axial direction, and the air extraction hole is formed in a downstream side of the most downstream recess in the axial direction.

2. The compressor according to claim 1, wherein a portion of the inner casing that is more downstream in the axial direction than the outlet guide vane rows extends inward in the radial direction toward a downstream side of the inner casing in the axial direction.

3. A gas turbine comprising:

the compressor described in claim 1;

a combustor that generates a combustion gas by burning an air-fuel mixture of a fuel and a high-pressure fluid generated by the compressor; and a turbine that is driven by the combustion gas.

4. A compressor comprising:

a rotor including a plurality of disks stacked in an axial direction, a shaft portion connected on a downstream side in the axial direction of the disks, and a plurality of rotor blade rows fixed to the plurality of disks;

a stator including a compressor casing surrounding the rotor from an outer peripheral side, and a plurality of stator vane rows fixed to the compressor casing and each of the plurality of stator vane rows being provided between corresponding adjacent ones of the plurality of rotor blade rows;

a plurality of outlet guide vane rows, wherein each of the plurality of outlet guide vane rows includes a plurality blade main bodies disposed at an interval in a circumferential direction to protrude from the compressor casing on a downstream side in the axial direction of one of the disks located on a most downstream side in the axial direction, and a plurality of inner shrouds connecting the blade main bodies in the circumferential direction, on an inner side in a radial direction, and wherein each row of the plurality of outlet guide vane rows is arranged at an interval in the axial direction, and the plurality of rotor blade rows is located upstream relative to the plurality of outlet guide vane rows;

a rotor extension portion provided on the downstream side in the axial direction of the disk located on the most downstream side in the axial direction, the rotor extension portion including a plurality of annular recesses, a recess of the plurality of annular recesses is provided for each row of the plurality of outlet guide vane rows to accommodate the respective inner shroud of each row of the plurality of outlet guide vane rows; and an inner casing disposed on a downstream side of the rotor extension portion in the axial direction with a gap between the rotor extension portion and the inner casing, the inner casing extending in the axial direction in a cylindrical shape, wherein the inner casing includes:

an outer peripheral wall surface forming, together with an inside surface of the compressor casing, a diffuser on a downstream side of the plurality of annular recesses in the axial direction;

and an inner peripheral wall surface forming an air extraction cavity between the inner peripheral wall surface and an outside surface of the shaft portion, wherein a portion on a downstream side of one recess of the plurality of annular recesses in the axial direction opens toward a downstream side of the inner casing in the axial direction, the one recess of the plurality of annular recesses being a most downstream recess of the plurality of annular recesses in the axial direction, and wherein a communication portion, in communication with the air extraction cavity, is formed between the one recess of the plurality of annular recesses and the inner casing.

5. The compressor according to claim 4, wherein the inner casing extends inward in the radial direction toward the downstream side of the inner casing in the axial direction.

6. The compressor according to claim 4 further comprising:

a seal portion that is provided on an inside surface of each of the inner shrouds and seals a flow of a fluid between the inside surface of each of the inner shrouds and a corresponding one of the plurality of annular recesses.

* * * * *